Patented Nov. 28, 1939

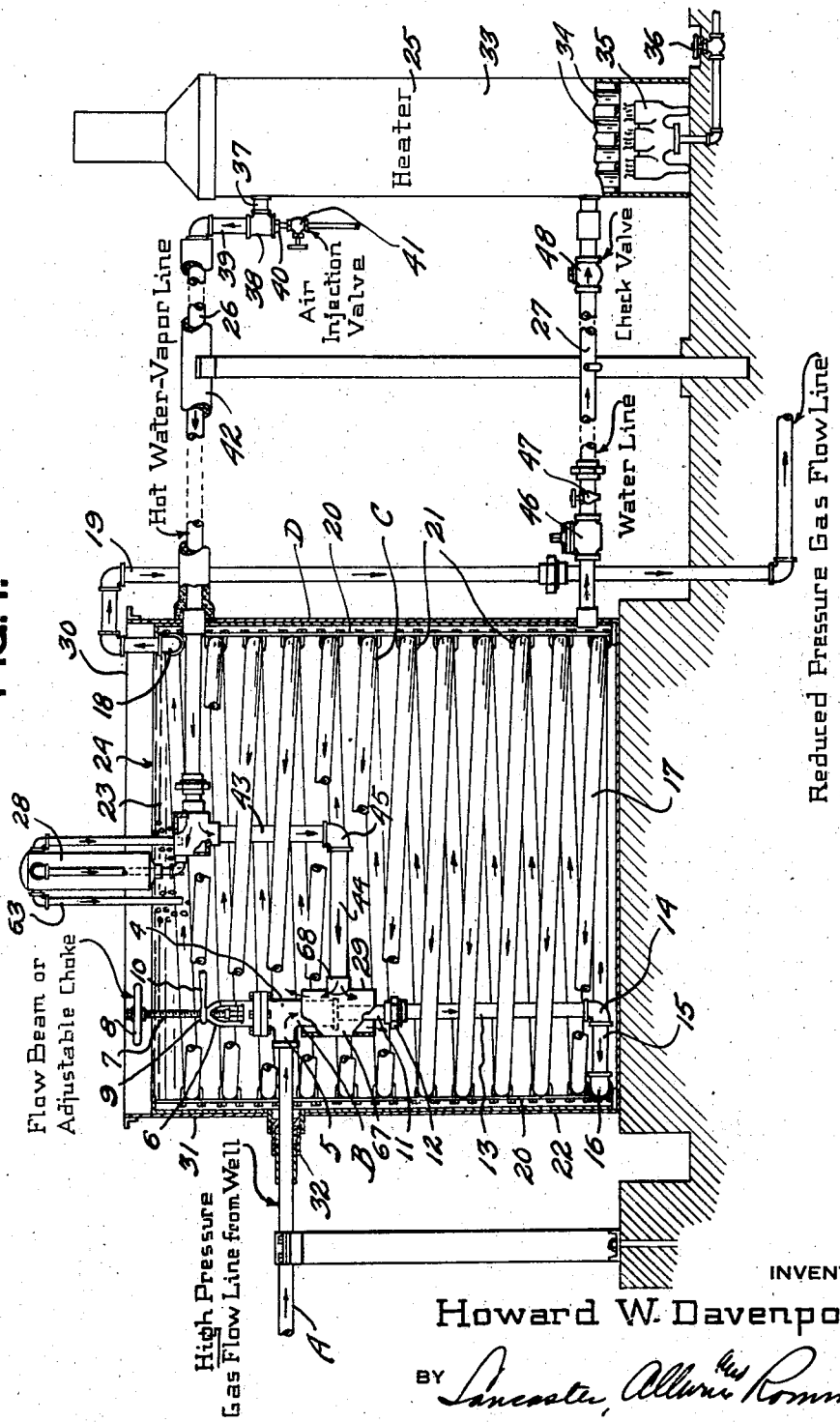

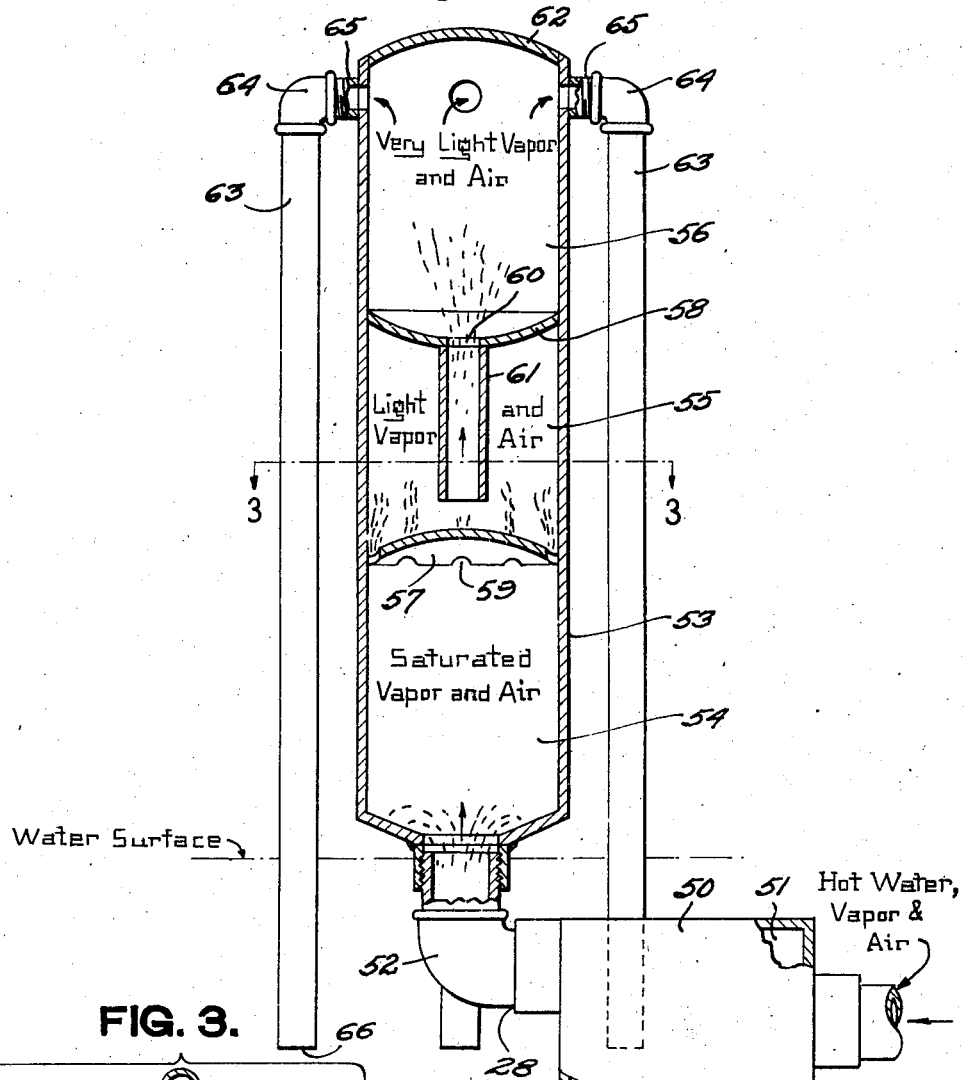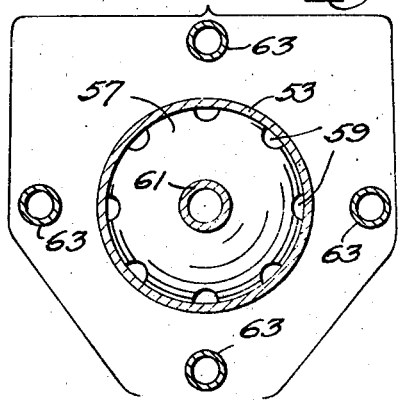

2,181,654

UNITED STATES PATENT OFFICE 2,181,654

APPARATUS FOR HEATING GAS

Howard W. Davenport, Minden, La.

Application January 24, 1938, Serial No. 186,749

3 Claims. (Cl. 62—122)

The present invention relates to a method and apparatus for heating gas obtained from high pressure gas wells, the temperature of which is ordinarily reduced to or below freezing point incident to its passage thru a flow mean sometimes termed a "choke".

The flow bean is used to control the flow of gas from the well, throttling it to any desired pressure and rate of flow. When gas under high pressure is discharged to a lower pressure thru the more or less restricted throat of the flow bean or choke, a rapid expansion of the gas causes a drop or fall in temperature sufficient to cause the formation of ice unless the flow bean is heated to a temperature higher than normal ambient temperature. Ice thus formed may close the throat of the flow bean. Many thousands of dollars have been spent in the gas fields for equipment to prevent freezing of flow beans. The customary method employed involves the use of steam and requires the constant attention of men to look after steam boilers and other equipment connected therewith.

The principal objects of the present invention are to provide a method for heating the flow bean and discharge line thereof, and consequently the gas flowing therethru, which is economical and safe, and apparatus for such heating which is low in cost of installation and to a large degree automatic in that it requires only infrequent attention of a caretaker.

Another object of the invention is to provide heating apparatus of the character described which uses a heated liquid, such as water, to initially prevent freezing of the flow bean and then gradually raise the temperature of the gas in the discharge line of the flow bean, so that it is suitable for introduction into the pipe lines for transportation, to gas and oil separators or to other equipment for transportation, storage or utilization of the gas.

Other objects and advantages of the invention will appear in the following detailed description, taken in connection with the accompanying drawings, forming a part of this specification, and in which drawings:

Figure 1 is a view partly in vertical section and partly in elevation of apparatus constructed according to the present invention.

Figure 2 is a detail view partly in vertical section and partly in elevation of a combined separator and condenser suitable for use as a part of the apparatus.

Figure 3 is a horizontal sectional view on the line 3—3 of Figure 2.

In the drawings, A designates a high pressure gas flow line from a well, B a flow bean to which line A delivers gas, C a discharge or reduced pressure gas flow line from the flow bean, which may have connection with a main pipe line for transportation of the gas, to a gas and oil separator, or any other equipment not shown in the drawings, for transportation, storage or utilization of the gas in any suitable manner, and D a thermo-siphon circulating system in which the flow bean and discharge line C are located.

The flow bean B may be of the adjustable choke type and in the example shown comprises a casing 4 having an intake extension 5 connected to the high presure gas line A and is at its lower portion connected to the discharge line C; a yoke 6 receiving a valve stem 7 on which is mounted hand wheel 8, and a lock nut 9 having a handle 10, adapted to hold the valve stem 7 in its adjusted position, all of which is quite common in the art.

The discharge line C is preferably connected to the lower portion of the flow bean B and in the example shown, comprises a nipple 11, union 12, vertical pipe 13, elbow 14, horizontal pipe 15, elbow 16, and pipe coil 17 which encircles the flow bean and extends to an elbow 18 in a zone above the flow bean casing 4. The elbow 16 may have connection with a reduced pressure gas flow line 19 leading to any suitable equipment not shown in the drawings. The convolutions of the pipe coil 17 may be held in spaced relation in any suitable manner, such as by the upright supports 20 and yokes 21 embracing portions of the pipe coil and connected to the supports 20.

In the example shown, the thermo-siphon circulating system comprises a tank 22 in which the flow bean B and discharge line C are located, submerged in water 23, the surface 24 of which may be near the top of the tank; a water heater 25 of any suitable type; a water-vapor line 26 between the upper portion of the heater 25 and tank 22; a return flow water line 27 between the lower portion of the tank 22 and heater 25; a combined separator and condenser 28 shown more in detail in Figures 2 and 3 with which the water-vapor line 26 has connection; and, a flow controller 29 in the zone of the flow bean B with which the water-vapor line 26 also has connection to direct hot water issuing into the controller to those parts of the flow bean which will more readily conduct the heat to the gas passing therethru and prevent freezing.

The tank 22 may have an open top 30 and the quantity of water in the system D is maintained in any suitable manner so that the water surface 24 is above the coil 17 near the top of tank 30. It is preferred to locate the flow bean B at an intermediate portion or zone of the tank 22, the high pressure gas flow line A passing thru a wall 31 and surrounded by a stuffing box 32.

Heater 25, in the example shown, comprises an upright cylindrical boiler 33 having vertical gas tubes 34 therein, heat being supplied by a gas or other burner 35 controlled by valve 36. The heater may, by way of example, be located approximately 250 feet from the well to eliminate fire hazards.

The water-vapor line 26 extends from the upper portion of the heater 25 to the upper portion of tank 21. At its portion adjacent the heater, it may have connection therewith thru a nipple 37 and T-fitting 38, the lateral opening of which has connection with nipple 37, the upper opening with a vertical pipe 39 forming a part of line 26, and its lower opening with an air injector 40 controlled by valve 41. Because the line 26 is relatively long, it may be covered in part by insulation 42. The air injector 40 may be used to increase the speed of flow of the water from the heater 25 to tank 22. Inside the tank 22, the line 26 has connection with the combined separator and condenser 28, and with the controller 29 as thru pipes 43 and 44, and elbow 45.

The water line 27 leads from the bottom of tank 22 to the bottom of boiler 33 and may be provided with a normally open shut-off valve 46, to be closed as when making repairs, a pet cock 47 to facilitate draining the tank and for the taking of samples of water, and a check valve 48 operable to prevent reverse flow in line 27, in the event considerable pressure is built up in heater 25.

The combined separator and condenser shown more in detail in Figures 2 and 3, preferably includes a minor cylinder 50, in the chamber 51 of which separation of water and vapor initially takes place, the water finds egress therefrom as thru pipe 43, and the vapor thru fitting 52 having connection with the upper part of cylinder 50. There is also a major upright cylinder 53, the cavity of which has communication with fitting 52 and is divided into three chambers 54, 55 and 56 as by baffles 57 and 58. The baffle 57 is preferably concavo-convex with its convex face uppermost and its marginal portion provided with openings 59 thru which products of condensation in chamber 55 may flow downwardly and return to the circulating water in the system. The baffle 58 is also preferably concavo-convex, with its convex face lowermost and is provided with a central opening 60 from which depends a tube 61, the lower end of which is adjacent to but spaced from the baffle 57. This opening 60 permits products of condensation in chamber 56 to flow to chamber 55. Adjacent the upper closed end 62 of cylinder 53, a plurality of depending discharge tubes 63 are connected to the cylinder, open to chamber 56 as by elbows 64 having screw threaded connection with nipples 65. These tubes have their lower open ends 66 below the water surface 24 as shown in Figures 1 and 3. In practice it has been found that with the discharge ends 66 of tubes 63 submerged six inches below the water surface 24, the water-vapor line 26 will work at a pressure not to exceed ⅓ of a pound per square inch. This pressure may be regulated by varying the extent to which the discharge ends 66 are submerged below the water surface 24. By way of example, swinging the tubes 63 laterally on the nipples 65 will bring the discharge ends 66 nearer the water surface and decrease the working pressure in the line 26. It is to be noted that the heat of the vapors issuing from the tubes 63 will be absorbed by or carried with the liquid in the tank 22, thus utilizing some of the heat of the vapors to heat coil 17.

The controller 29 is preferably an open ended cylinder 67 surrounding and spaced from the flow bean B mainly at the zone of the choke thereof, and has a nipple 68 connected to horizontal pipe 44.

The apparatus is automatic in that the water in the tank 22 cooled by operation of the flow bean and gas in the lower part of coil 17 becomes heavier and sinks to the bottom of the tank, and enters the lower part of heater 25 thru line 27, displacing the heated water in boiler 33. This hot water flows thru water-vapor line 26 and is finally delivered to the zone surrounding the flow bean. Most of the water finds egress at the upper portion of controller 29 altho some passes downwardly as shown by arrow in Figure 1. It is to be noted the gas passing from the flow bean enters that portion of the discharge line C nearest the bottom of tank 22 where the water 23 is of lowest temperature, and the temperature of the gas is gradually increased as it rises in coil 17.

During a test extending over a period of approximately thirty-seven days, with an intake pressure of approximately 3,000 pounds thru a 3/16-inch choke and a discharge pressure of approximately 480 pounds at the upper end of coil 17, it was found that with a temperature slightly about 32° F., at the discharge of the flow bean, the temperature of the gas after passing thru coil 17 was approximately 100° F., which dropped to approximately 80° F., when reaching an oil and gas separator some 400 feet from the heating system, eliminating all freezing of the flow bean, discharge line to the separator, separator valves and controls associated with the oil and gas separator.

The method may be carried on continuously without frequent attention of a caretaker, since it operates in a thermo-siphonic manner, no pumps or steam generating equipment being necessary.

I claim:

1. In heating apparatus for gas, the combination of a tank, a flow bean to which gas under high pressure is delivered, located at an intermediate portion of the tank, a circuitous discharge line in the tank leading from the flow bean to the lower portion of the tank and thence to the upper portion of the tank, a water heater, a water-vapor line between the heater and the tank and open to the upper portion of the tank and to a zone adjacent said flow bean, and a water line between the lower portion of the tank and heater.

2. In heating apparatus for gas, the combination of a tank, a flow bean to which gas under high pressure is delivered, located at an intermediate portion of the tank, a circuitous discharge line in the tank leading from the flow bean to the lower portion of the tank and thence to the upper portion of the tank, a water heater, a combined separator and condenser at the upper portion of the tank, a water-vapor line between the heater and tank, connected to said combined separator and condenser and having an opening at a zone adjacent said flow bean, and a water line between the lower portion of the tank and heater.

3. In heating apparatus for gas, the combination of a tank containing water, a flow bean to which gas under pressure is delivered, located in the tank below the water surface, a circuitous discharge line in the tank leading from the flow bean to the lower portion of the tank and thence to the upper portion of the tank, a water heater, a combined separator and condenser at the upper portion of the tank having its discharge submerged in the tank, a water-vapor line between the heater and tank, connected to said combined separator and condenser and having an opening at a zone adjacent said flow bean, and a water line between the lower portion of the tank and heater.

HOWARD W. DAVENPORT.